Patented Sept. 18, 1951

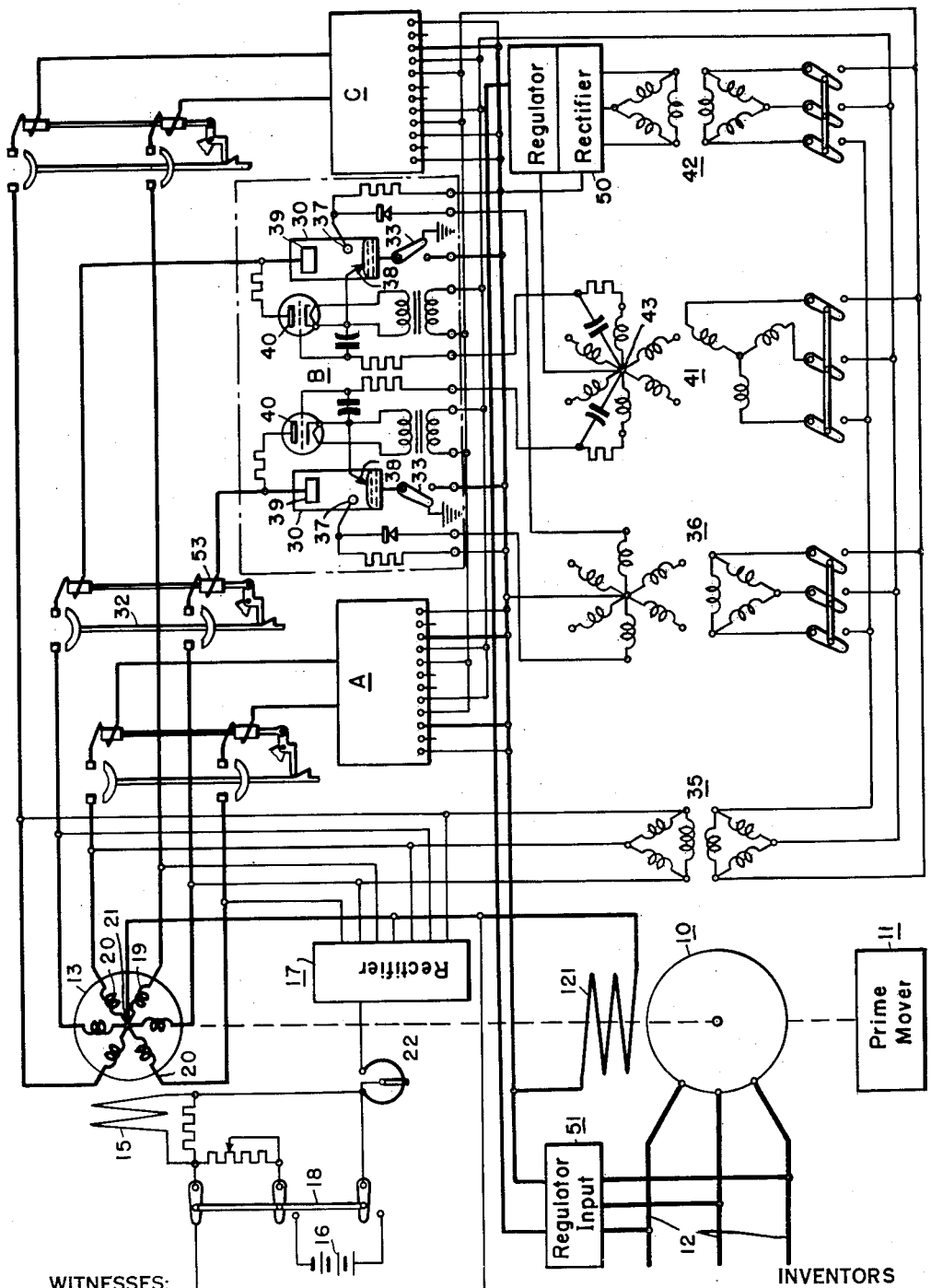

2,568,407

UNITED STATES PATENT OFFICE 2,568,407

EXCITATION SYSTEM

Donald R. Pattison and William H. Lambert, Johnstown, and Arthur H. Phillips, Reading, Pa., assignors to Westinghouse Electric Corporation, East Pittsburgh, Pa., a corporation of Pennsylvania Application December 10, 1949, Serial No. 132,314

2 Claims. (Cl. 322—28)

Our invention relates to an excitation system and particularly to such a system for providing continuous excitation over long intervals of time.

In the production and distribution of electrical energy, it is desirable to maintain substantially constant service regardless of any impediments or accidents in the generating system. This used to be accomplished by providing a plurality of relatively small machines and maintaining a portion of them in stand-by condition in the event of fault in any machine. However, the alternating-current generators as now constructed are of such large size that it is impractical to maintain any appreciable stand-by service. Further, the modern alternators are so reliable that they will operate for extremely long periods without any shutdown for service or other reason.

The excitation systems, however, have not kept pace with the generators themselves. It has heretofore been customary to provide one or more direct-current machines either independently driven or attached to the alternator to furnish the excitation current for the alternator.

A study of the outages occurring over a long period in a large generator system indicates that the faults on these auxiliary direct-current machines have been responsible for a major portion of the shutdowns. It has heretofore been suggested that rectified current be utilized to excite the generators, but this has been unsatisfactory as the supply for the generator is therefore dependent on entirely different systems. Consequently, faults in either of the systems may shut down the generator.

According to our invention, we have provided an auxiliary alternating-current machine rigidly attached to the alternator or generator and have provided rectifying means between the auxiliary generator and the field winding of the alternator, and have provided sufficient capacity in the auxiliary machine and in the rectifying system so that a considerable portion of the rectifying system may be shut down without impairing the ability of the main generator to carry load.

In order to keep the potential of the auxiliary generator totally independent of the output of the main generator, we provide a pair of excitation sources so that the machine may be put in operation or operated from an independent direct-current source such as a battery, but preferably it has been maintained in operation by self excitation from an auxiliary rectifier fed from the terminals of the auxiliary generator.

The output potential of the auxiliary generator is derived from a plurality of phase windings each of which has diametrically opposite phase terminals and a center tap. Each of the phase windings is connected to a pair of vapor electric converters so that any pair of converters may be shut down or removed from service for extended repairs, without disturbing other pairs of converters. The excitation system for all of the pairs of converters is maintained from the terminal voltage of the auxiliary generator so that the field current of the main generator will be maintained constantly so long as there is no major fault in the auxiliary generator. The regulation of the output potential of the converters is accomplished by means of a regulator supplied with potential from a regulator input connected to the terminal potential of the main generator. This regulator is supplied with rectified current also from the auxiliary generator so that the rectifiers are controlled directly in response to the output potential of the main generator.

It is, accordingly, an object of our invention to provide an exciting system for an alternating-current generator in which a portion of the excitation power may be removed from service without discontinuing operation of the main generator.

It is a further object of our invention to provide an exciting system having an alternating-current auxiliary generator directly connected to the main generator and having controlled rectifiers between the output terminal of the auxiliary generator and the field winding of the main generator.

It is a further object of our invention to provide an excitation system of extreme reliability.

Further objects and advantages of our invention will be apparent from the following detailed description taken in conjunction with the accompanying drawing in which the figure is a schematic illustration of a generating system embodying our invention.

In the exemplary embodiment of our invention, an alternating-current generator 10 driven from a prime mover 11 supplies energy to an alternating-current circuit 12. Directly connected to the main generator 10 and its prime mover 11 is an alternating-current generator 13 for providing the exciting current for the field winding 121 of generator 10. The auxiliary generator 13 is provided with a plurality of phase windings 19 each of which has a pair of opposed phase terminals 20 and a midtap 21. A field winding 15 is provided for the auxiliary generator 13, and the field winding 15 may be energized from either an auxiliary power source such as the battery 16, or preferably from a rectifier 17 connected to the terminals of the generator 13. A switch 18 is provided for shifting the field 15 from either the battery 16 or the rectifier 17. Preferably, the rectifier 17 is controlled so that the potential supplied to the field winding 15 is such as to maintain the potential of the auxiliary generator 13 constant, and usually a regulator 22 is placed in circuit with the field winding 15 so that the terminal voltage of the auxiliary generator 13 is maintained substantially constant.

Each pair of phase terminals 20 of the auxiliary generator 13 is connected through a pair of vapor electric devices 30, herein shown as of the ignitron type, to the field winding 121 of the main generator 10. Each pair A—B—C of rectifiers 30 or vapor electric devices is connected so that a single switch 32 controls both tubes of the pair of converters A—B—C so that when any fault exists which requires the shutting down of one of the tubes 30, the alternate tube 30 will likewise be shut down so that the load on the auxiliary generator 13 will be maintained evenly balanced.

The capacities of the generator 13 and of the rectifying devices 30 are such that when any pair of phase terminals 20 and its associated pair A, B or C of converters 30 are out of service the remaining pairs or valves 30 will be able to continuously supply the normal demand of the field winding 121 of the main generator 10. Therefore, in the event of fault, any tube 30 or pair of tubes 30 may be shut down and removed from service for replacement or repair. For this purpose we have provided not only the main anode switch 32 which interrupts both tubes 30 of the pair, but also a disconnect switch 33 in the output side of the converter so that any tube or tubes 30 may be completely isolated from the setup and, if desired, removed with safety from the immediate vicinity of any of the remaining tubes 30.

In order to provide excitation throughout any possible angle of operation of the tubes 30, we have provided an exciting transformer 35 directly connected to the phase terminals 20 of the auxiliary generator 13 and from this exciting transformer 35 have provided a plurality of excitation circuits including a transformer 36 supplying half cycle exciting current to keep-alive electrodes 37 in each of the converter valves 30. Also, we have provided a make-alive electrode 38 supplied with energy from the anode 39 of its associated tube 30 through a controlled auxiliary valve 40 so that the make-alive electrode 18 may be energized at any time during the half cycle of positive potential of the anode 39; and at any time that the make-alive electrode 38 initiates a cathode spot, it will be maintained for the remaining portion of the half cycle by the keep-alive electrode 37.

A periodic control potential for each of the auxiliary valves 40 is supplied through an auxiliary transformer 41 substantially in phase with the potential applied to the anode 39, and a biasing potential is provided by means of an auxiliary transformer 42 also connected to the converter exciting circuit. The biasing transformer 42 has its potential rectified and applied through a regulator 50 to the neutral connection 43 of the grid transformer 41 of the auxilary valves 40. The regulator 50 is in turn supplied with a potential from a regulator input device 51, the potential of which is controlled or received from the terminal potential of the main alternating-current generator 10. The regulator 50 then modifies the bias applied to the periodic potential of the grid transformer 41 so that the auxiliary valves 40 are controlled at any portion in the half cycle to supply a variable current to the field winding 121 of the main generator 10 in proportion to the output potential demands. This provides a system which is highly mobile in that it can rapidly supply to the field winding 121 any proportion of the output potential of the auxiliary generator 13 so that the output potential of the main generator 10 may be regulated to either constant potential or any other arrangement that may be desirable in spite of the fact that the load on the main generator 10 may be highly variable.

In the operation of our system, the prime mover 11 is started and brings the main generator 10 and the auxiliary generator 13 up to speed after which the field 15 of the auxiliary generator 13 is excited, usually from the auxiliary source 16; and as soon as potential appears at its terminal 20, it is switched over to the auxiliary rectifier 17 so that the field winding 15 of the auxiliary generator 13 is constantly controlled from the output potential of the auxiliary generator 13. The converters 30 are then connected into the output potential of the auxiliary generator, and at least one of the converter valves 30 will start operation because of the potentials derived from the anode 39 through the auxiliary valve 40, which will be controlled in proportion to the output potential of the main generator 10.

As the main generator 10 comes up to voltage, the angle of delay in the converters 30 will be controlled so that the field winding 121 will receive sufficient current to maintain the desired output potential of the main generator 10. Any change in the loading of the main generator 10 which causes a change in the terminal voltage of the main generator 10 will change the potential supplied by the regulator input 51 which again operates the regulator 50 to change the bias supplied to the auxiliary valves 40 so that the current supplied to the main field winding 121 will be immediately adjusted to any variation in the generator output.

In the event that any fault should occur in any valve 30 of the converter, the fault current will only trip the relay 53 operating the switches 32 controlling that valve 30 and its complementary valve so that a continuous exciting current will be supplied to the field 121 in the main generator 10 by the auxiliary generator 13 through the remaining pairs of converter valves 30. Any reduction in current to the field winding 121 will be compensated for by satisfactory adjustment of the firing angle of the remaining pairs of converter tubes 30.

As heretofore stated, the capacity of the auxiliary generator windings 19 and the pairs A—B—C of converter valves 30 can be such that any single pair A, B or C may supply, for at least a short time, the demands of the main field winding 121, so that in spite of any faults that might occur in a conversion system, the potential output of the main generator 10 will be substantially unaffected and repairs may be completed without any necessity of shutdown or any impairment of the service supplied by the generator.

For purpose of illustration, we have shown a specific embodiment of our invention and described the same according to the best of our present understanding thereof, but we wish it to be understood that such embodiment is exemplary only, and that changes and modifications can be made therein without departing from the true spirit of our invention or the scope of the appended claims.

We claim as our invention:

1. A commutatorless ultra-reliable variable-voltage supply-means for a direct-current load-circuit, comprising the combination including a polyphase generator having three pairs of oppositely poled phase-terminals and a common midtap for all phases, a pair of delayed-firing vapor-electric rectifier-valves for each pair of phase-terminals, said direct-current load-circuit being normally energized from all three of said pairs of rectifier-valves and from said common midtap, said polyphase generator having a field-winding, rectified-current regulated excitation-means for so exciting said field-winding of said generator from at least some of its own phase-terminals as to maintain a substantially constant voltage on said phase-terminals, means for obtaining a controlled delayed firing of said pairs of rectifier-valves whereby to control the voltage of the direct-current load-circuit, and a separate switching-means for each pair of rectifier-valves for simultaneously switching out both valves of any pair when either valve of said pair requires switching, the capacities of said generator and said rectifier-valves being such that any two of said three pairs of valves can carry the demands of said direct-current load-circuit, and that any single pair of valves can carry the demands of said direct-current load-circuit at least temporarily and under certain operating conditions.

2. A main alternating-current generator having main alternating-current output-terminals, a main field-winding, a commutatorless ultra-reliable variable-voltage direct-current excitation-means for exciting said main field-winding of the generator, and a voltage-regulating means for so controlling the voltage of said excitation-means in response to the generator-output as to maintain desired output-voltage conditions on the generator; characterized by said excitation-means comprising the combination including a polyphase exciter-alternator driven from the same means which drives the main generator, said exciter-alternator having three pairs of oppositely poled phase-terminals and a common midtap for all phases, a pair of delayed-firing vapor-electric rectifier-valves for each pair of phase-terminals, the main field-winding of the main generator being normally energized from all three of said pairs of rectifier-valves and from said common midtap, said exciter-alternator having a field-winding, rectified-current regulated excitation means for so exciting said field-winding of said exciter-alternator from at least some of its own phase-terminals as to maintain a substantially constant voltage on said phase-terminals, means for obtaining a controlled delayed firing of said pairs of rectifier-valves whereby to control the voltage of the excitation-means for the main field-winding of the main generator in response to the requirements of said voltage-regulating means, and a separate switching-means for each pair of rectifier-valves for simultaneously switching out both valves of any pair when either valve of said pair requires switching, the capacities of said exciter-alternator and said rectifier-valves being such that any two of said three pairs of valves can carry the excitation-requirements of the main field-winding of the main generator, and that any single pair of valves can carry said excitation-requirements at least temporarily and under certain operating-conditions.

DONALD R. PATTISON.
WILLIAM H. LAMBERT.
ARTHUR H. PHILLIPS.

REFERENCES CITED

The following references are of record in the file of this patent:

UNITED STATES PATENTS

| Number | Name | Date |
|---|---|---|
| Re. 22,154 | Mandl | Aug. 4, 1942 |
| 2,186,847 | Troger | Jan. 9, 1940 |
| 2,313,957 | Myers | Mar. 16, 1943 |
| 2,454,582 | Thompson et al. | Nov. 23, 1948 |

OTHER REFERENCES

Publication: "The Design of an Electronic Exciter for Large Generators," by W. R. Farley and C. R. Marcum, AIEE Paper 46-73, December 1945.